US010756928B2

(12) United States Patent
Mulligan et al.

(10) Patent No.: US 10,756,928 B2
(45) Date of Patent: Aug. 25, 2020

(54) INTERCONNECTION BETWEEN ENTERPRISE NETWORK CUSTOMERS AND NETWORK-BASED CLOUD SERVICE PROVIDERS

(71) Applicant: AT&T Intellectual Property I, L.P., Atlanta, GA (US)

(72) Inventors: John T. Mulligan, Brick, NJ (US); Diana L. Toll, Robbinsville, NJ (US); Bo S. Quach, Tampa, FL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 989 days.

(21) Appl. No.: 15/223,077

(22) Filed: Jul. 29, 2016

(65) Prior Publication Data

US 2018/0034664 A1    Feb. 1, 2018

(51) Int. Cl.
*H04L 12/46* (2006.01)
*H04L 29/08* (2006.01)
(Continued)

(52) U.S. Cl.
CPC ......... *H04L 12/4641* (2013.01); *H04L 45/64* (2013.01); *H04L 61/2514* (2013.01);
(Continued)

(58) Field of Classification Search
CPC . H04L 12/4641; H04L 45/64; H04L 61/2514; H04L 63/0272; H04L 63/20; H04L 67/10
See application file for complete search history.

(56) References Cited

U.S. PATENT DOCUMENTS 5,983,269 A    11/1999  Mattson et al.
7,203,740 B1   4/2007   Putzolu et al.
(Continued)

FOREIGN PATENT DOCUMENTS

| WO | 2013072904 A1 | 5/2013 |
| WO | 2013078548 A1 | 6/2013 |
| WO | 2015138043 A2 | 9/2015 |

OTHER PUBLICATIONS

Singla, Ankur and Bruno Rijsman, "Architecture Documentation," Open Contrail, opencontrail.org, 2015. http://www.opencontrail.org/opencontrail-architecture-documentation/.
(Continued)

*Primary Examiner* — Tonia L Dollinger
*Assistant Examiner* — Joseph M Cousins

(57) ABSTRACT

In a network service provider environment, a number of interconnection routing configuration templates provide a consistent approach for configuring associated interconnect network segments between enterprise network customer sites and cloud service providers. At least two types of configuration template are used to create at least two types of routing arrangement: a first template for creating an "unconstrained" routing arrangement having "any to any" connections; and a second template for creating a "partitioned" routing arrangement in which traffic between partitions must be operated on by a virtual network function. Additionally, the "partitioned" routing arrangement may use either a shared VPN or a segregated VPN facing the cloud service providers. The use of the interconnection routing configuration templates may be automated. The interconnection routing configuration templates can be applied in a recursive fashion to different parts of the end-to-end connectivity.

2 Claims, 14 Drawing Sheets

(51) Int. Cl.
*H04L 29/06* (2006.01)
*H04L 29/12* (2006.01)
*H04L 12/715* (2013.01)

(52) U.S. Cl.
CPC .......... *H04L 63/0272* (2013.01); *H04L 63/20* (2013.01); *H04L 67/10* (2013.01)

(56) References Cited

U.S. PATENT DOCUMENTS

| | | |
|---|---|---|
| 7,626,944 B1 | 12/2009 | Riddle |
| 7,953,100 B2 | 5/2011 | Selitser et al. |
| 7,953,865 B1 | 5/2011 | Miller et al. |
| 7,966,388 B1 | 6/2011 | Pugaczewski et al. |
| 8,159,971 B2 | 4/2012 | Singh et al. |
| 8,312,129 B1 | 11/2012 | Miller et al. |
| 8,369,333 B2 | 2/2013 | Hao et al. |
| 8,478,848 B2 | 7/2013 | Minert |
| 8,650,299 B1 | 2/2014 | Huang et al. |
| 8,667,138 B2 | 3/2014 | Ganesan et al. |
| 8,699,499 B2 | 4/2014 | Mulligan et al. |
| 8,819,195 B2 | 8/2014 | Flavel et al. |
| 8,849,924 B2 | 9/2014 | Ramaswamy et al. |
| 8,898,293 B2 | 11/2014 | Raleigh et al. |
| 9,063,789 B2 | 6/2015 | Beaty et al. |
| 2014/0280961 A1 | 12/2014 | Martinez et al. |
| 2014/0366155 A1 | 12/2014 | Chang et al. |
| 2014/0372614 A1 | 12/2014 | Tan et al. |
| 2015/0067190 A1 | 3/2015 | Naseh et al. |
| 2015/0149410 A1 | 5/2015 | Haon et al. |
| 2015/0263983 A1 | 9/2015 | Brennan et al. |
| 2015/0280988 A1 | 10/2015 | Vorst et al. |
| 2016/0088092 A1* | 3/2016 | Cardona-Gonzalez ...... H04L 67/141 709/227 |
| 2016/0308762 A1* | 10/2016 | Teng ............... H04L 45/50 |
| 2017/0078248 A1* | 3/2017 | Bian ............ H04L 63/0272 |
| 2017/0245316 A1* | 8/2017 | Salkintzis ........... H04W 48/16 |
| 2017/0353384 A1* | 12/2017 | Chayat ............... H04L 45/566 |
| 2018/0018195 A1* | 1/2018 | Kim ................. H04L 41/12 |
| 2019/0334796 A1* | 10/2019 | Chou ............ H04L 41/5009 |

OTHER PUBLICATIONS

Vising, Lars, "Mobile Widget Architecture," Dept. of Information Technology, Uppsala Univ., uu.dive-portal.org, Nov. 2008. http://uu.diva-portal.org/smash/get/diva2:174157/FULLTEXT01.pdf.

Lantz, Bob, Brandon Heller, and Nick McKeown. "A network in a laptop: rapid prototyping for software-defined networks." Proceedings of the 9th ACM SIGCOMM Workshop on Hot Topics in Networks. ACM, 2010. http://klamath.stanford.edu/~nickm/papers/a19-lantz.pdf.

Dupuy, Alexander, et al. "NEST: A network simulation and prototyping testbed." Communications of the ACM 33.10 (1990):63-74. http://researcher.watson.ibm.com/researcher/files/us-bacon/Dupuy89NEST.pdf.

* cited by examiner

INTERCONNECTION BETWEEN ENTERPRISE NETWORK CUSTOMERS AND NETWORK-BASED CLOUD SERVICE PROVIDERS

TECHNICAL FIELD

Embodiments of the present disclosure relate to providing enterprise network services. Specifically, the disclosure relates to network service chain provisioning to connect enterprise sites of service customers and network-based cloud service providers.

BACKGROUND

In addition to providing bandwidth, modern network service providers may offer services to enterprise customers including enterprise networking, virtual private networking, virtual network functions and Internet and cloud services connectivity. A network service provider must therefore "service chain" together several functions that a customer needs in the path of their network connectivity between their enterprise sites and network-based cloud service providers. To do that, the network service provider must define and consistently implement the characteristics of the network segments that make up that end-to-end connectivity. Presently disclosed is a series of interconnection routing configuration templates that may be used to consistently deploy the right network connectivity needed as part of an overall service context.

To implement connectivity in accordance with the specifications of enterprise customers and cloud service providers, network service providers must frequently string together multiple network functions, such as a network address translator, a firewall, a WAN Accelerator, a rate limiter/traffic shaper, etc., in various combinations across a series of network segments. The complexity of the network configurations can become untenable. Until now, the number of functions has been relatively small and network service providers have approached this problem via a brute force approach, using hand-crafted individual configurations for network segments. With the advent of numerous virtualized functions that can be inserted in arbitrary combinations, that approach is no longer viable.

BRIEF DESCRIPTION OF THE DRAWINGS

The present disclosure can be readily understood by considering the following detailed description in conjunction with the accompanying drawings, in which.

DETAILED DESCRIPTION OF EXEMPLARY EMBODIMENTS

Presently disclosed is the definition of small number of interconnection routing configuration templates that provide a consistent approach for configuring associated interconnect network segments. The use of the interconnection routing configuration templates may be automated. The approach is also scalable because the interconnection routing configuration templates can be applied in a recursive fashion to different parts of the end-to-end connectivity.

Embodiments of the present disclosure include a computer communication network interconnecting customer enterprise sites of a network customer with network-based cloud service providers. The network comprises a plurality of routers interconnecting the customer enterprise sites with first and second network-based cloud service providers, and a network configuration server connected for configuring the routers. The network configuration server includes a processor and memory containing computer readable instructions that, when executed by the processor, cause the processor to perform the following operations: applying a first routing configuration template to configure a first subset of the routers to create a first routing arrangement connecting the customer enterprise sites and the first network-based cloud service provider, the first routing arrangement establishing unconstrained reachability between the customer enterprise sites and the first network-based cloud service provider; and applying a second routing configuration template to configure a second subset of the routers to create a second routing arrangement connecting the customer enterprise sites and the second network-based cloud service provider, the second routing arrangement requiring processing, by a virtual network function, of traffic between the customer enterprise sites and the second network-based cloud service provider.

Figure 1:
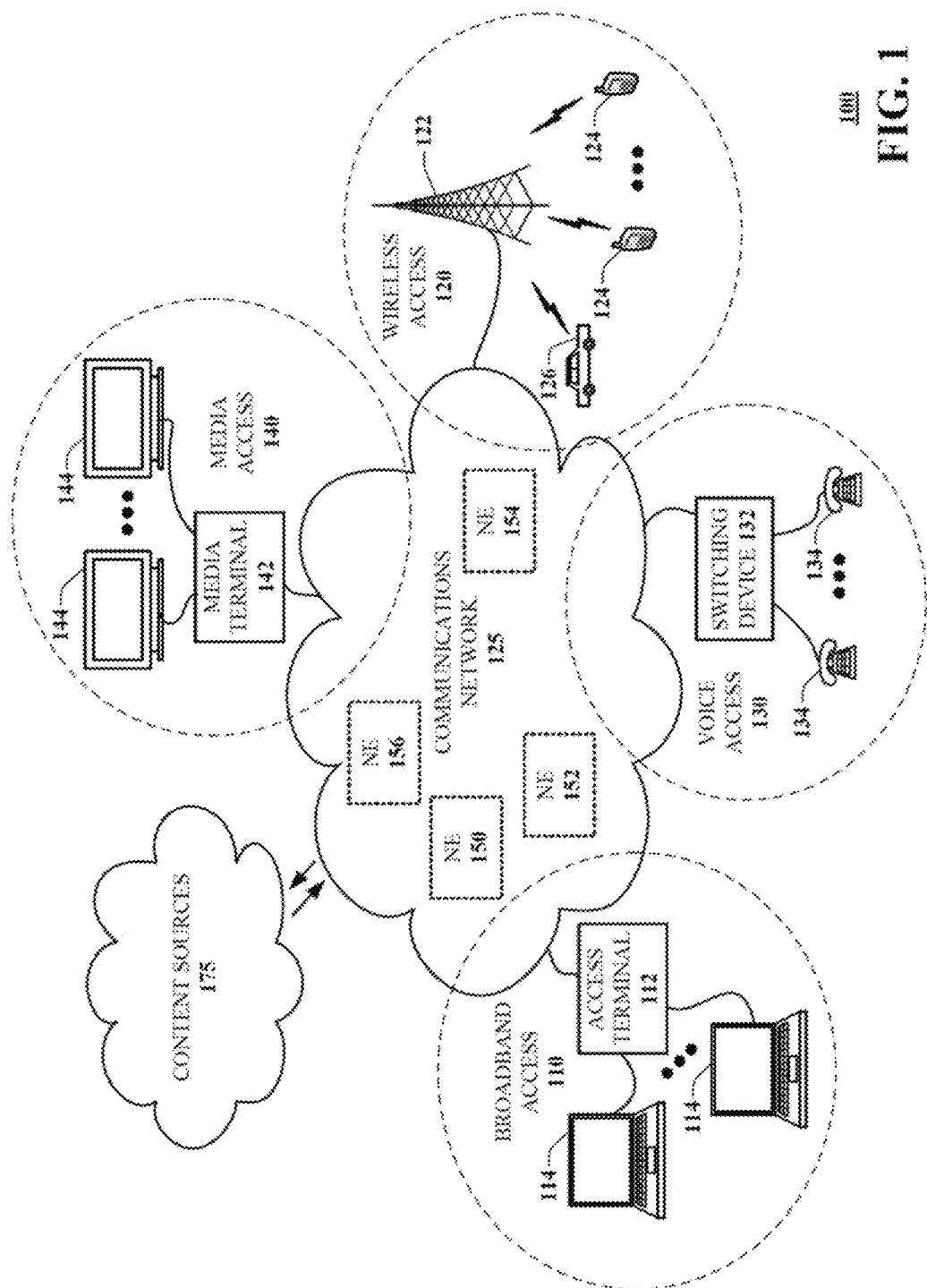
FIG. 1 is a block diagram illustrating an example communications network in accordance with aspects of the present disclosure.

Referring now to FIG. 1, a block diagram 100 illustrating an example, non-limiting embodiment of a communications network in accordance with various aspects described herein, is shown. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text or other media. While broadband access 110, wireless access 120, voice access 130 and media access 140 are shown separately, one or more of these forms of access can be combined to provide multiple access services to a single client device.

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a simple IP data network, a circuit switched or packet switched telephone network, a voice over Internet protocol (VoIP) network, Internet protocol (IP) based television network, a cable network, a passive or active optical network, a 4 G or higher wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4 G or higher modem, an optical modem and/or other access devices.

In various embodiments, the base station or access point 122 can include a 4 G or higher base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
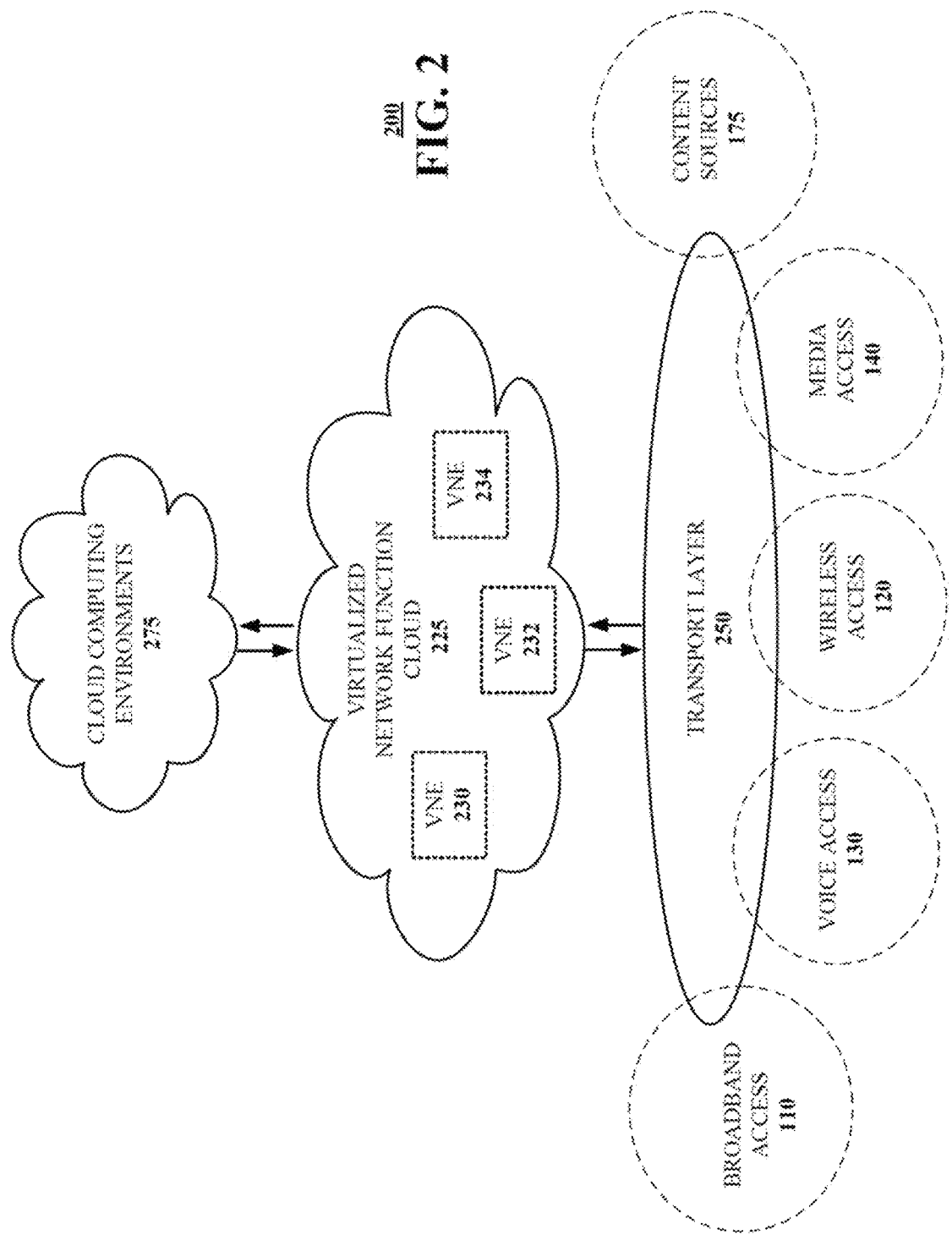
FIG. 2 is a block diagram illustrating an example virtualized communication network in accordance with aspects of the present disclosure.

Referring now to FIG. 2, a block diagram 200 illustrating an example, non-limiting embodiment of a virtualized communication network in accordance with various aspects described herein, is shown. In particular a virtualized communication network is presented that can be used to implement some or all of the communications network 125 presented in conjunction with FIG. 1.

In particular, a cloud networking architecture is shown that leverages cloud technologies and supports rapid innovation and scalability via a transport layer 250, virtualized network function cloud 225 and/or one or more cloud computing environments 275. In various embodiments, this cloud networking architecture is an open architecture that leverages application programming interfaces (APIs), reduces complexity from services and operations; supports more nimble business models and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 230, 232, 234, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrate. The most typical type of substrate being servers that support Network Function Virtualization (NFV), followed by packet forwarding capabilities based on generic computing resources, with specialized network technologies brought to bear when general purpose processors or merchant silicon are not appropriate. In this case, communication services can be implemented as cloud-centric workloads.

As an example, a traditional network element 150, such as an edge router can be implemented via a virtual network element 230 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing that infrastructure easier to manage.

In an embodiment, the transport layer 250 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 230, 232 or 234. These network elements can be included in transport layer 250.

The virtualized network function cloud 225 interfaces with the transport layer 250 to provide the virtual network elements 230, 232, 234, etc. to provide specific NFVs. In particular, the virtualized network function cloud 225 leverages cloud operations, applications, and architectures to support networking workloads. The virtualized network elements 230, 232 and 234 can employ network function software that provides either a one-for-one mapping of traditional network element function or alternately some combination of network functions designed for cloud computing. For example, virtualized network elements 230, 232 and 234 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large aggregates of traffic, their workload can be distributed across a number of servers—each of which adds a portion of the capability, and overall which creates an elastic function with higher availability than its former monolithic version. These virtual network elements 230, 232, 234, etc. can be instantiated and managed using an orchestration approach similar to those used in cloud compute services.

The cloud computing environments 275 can interface with the virtualized network function cloud 225 via APIs that expose functional capabilities of the VNE 230, 232, 234, etc. to provide the flexible and expanded capabilities to the virtualized network function cloud 225. In particular, network workloads may have applications distributed across the virtualized network function cloud 225 and cloud computing environment 275 and in the commercial cloud, or might simply orchestrate workloads supported entirely in NFV infrastructure from these third party locations.

Figure 3:
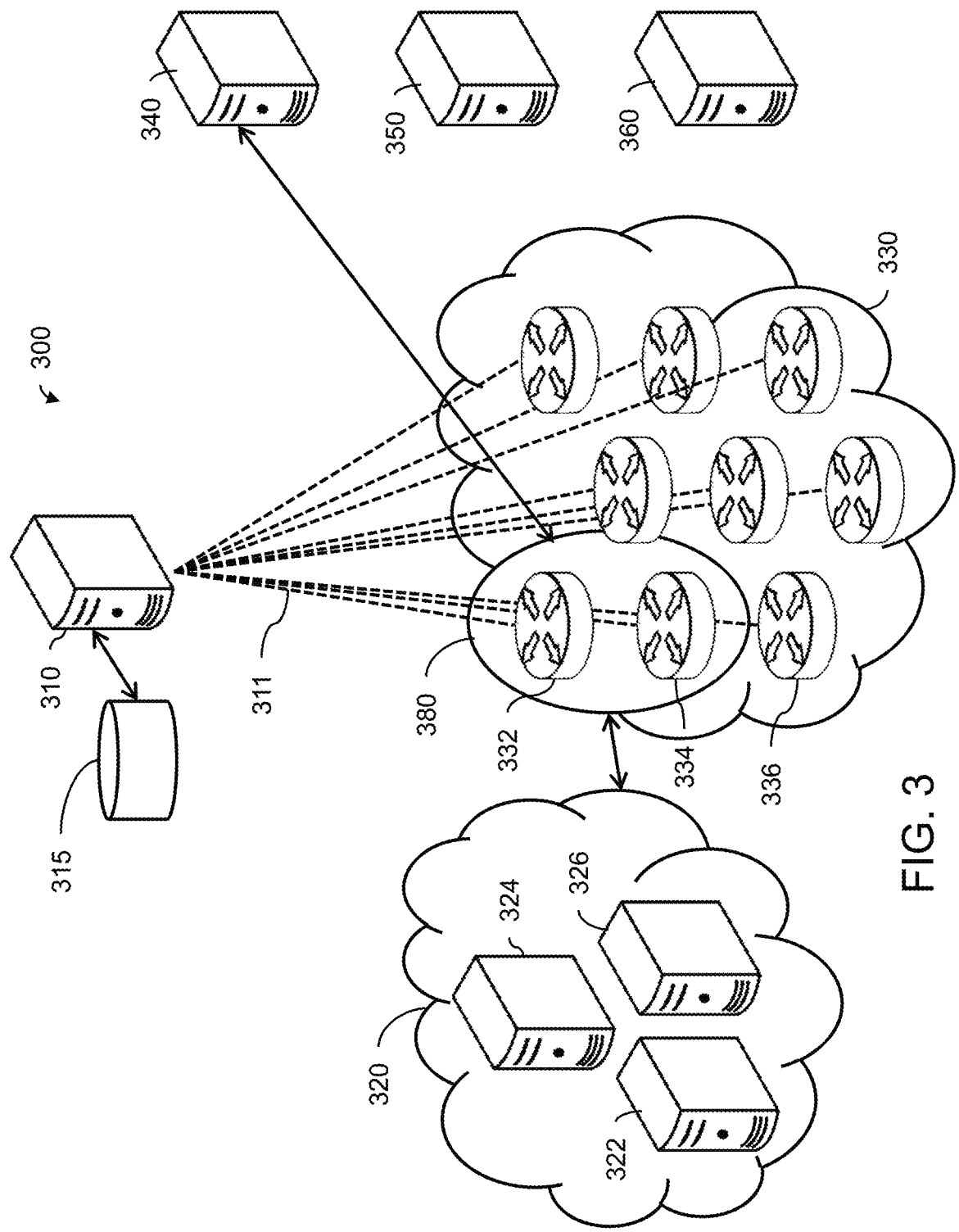
FIG. 3 is a schematic representation of a communications network in accordance with aspects of the present disclosure.

A communications network 300 in accordance with aspects of the disclosure, shown in FIG. 3, includes a routing configuration server 310 having at least one processor and having access to a data storage system 315 storing data such as interconnection routing configuration templates and computer readable instructions. The server may be a stand-alone server as shown, or may be part of server system or distributed computing network. The routing configuration server 310 is operated by a network service provider and has administrative access, represented by dashed lines 311, to a number of routers in a routing network 330, including routers 332, 334, 336.

Customer site endpoints 322, 324, 326 are provided by the network service provider for operation by its network service customers. The customer site endpoints may be members of an exclusive community of interest or trusted domain 320 such as a virtual private network (VPN) operated by a single network service customer. A customer site may be a Layer 3 multiprotocol label switching (MPLS) VPN endpoint (customer sites connected to the common backbone (CBB) via a network service provider VPN, a private network transport (PNT), or an IP-enabled frame relay (IPeFR) service). The customer site endpoints 322, 324, 326 may also include endpoints that are reachable via those MPLS VPN's. Customer sites may be connected using switched Ethernet access to a network service provider VPN, mobility access to a network service provider VPN, or a "bring your own" access to a network service provider VPN via a virtual Internet gateway (VIG). Future customer site endpoints may be connected using a direct switched Ethernet/virtual private LAN service access (without a VPN), or direct secure mobility access (without a VPN).

Cloud service providers 340, 350, 360 provide cloud services used by the customer sites. Examples of services provided by the cloud service providers include, but are not limited to, cloud-based productivity software, data storage and retrieval, retail catalog and payment services, accounting services, communications services and specialized business software services.

The network orchestration/service chaining between the customer site endpoints 322, 324, 326 and the cloud service providers 340, 350, 360 therefore must meet the requirements and specifications of the particular types of cloud service providers, while also meeting requirements of the network service customers and the network service provider. In accordance with aspects of the present disclosure, the routing configuration server 310 uses routing configuration templates stored in the data storage system 315 to configure the routers of the routing system 330 to perform the described routing requirements between the network services customers and the cloud service providers.

In the example network 300, the routing configuration server 310 has applied a routing configuration template to configure a subset 380 of the routers in the routing system 330 to implement a service chain between the network services customer network 320 and the cloud service provider 340. The routing configuration template is used by the server 310 to configure one or more routers of the subset 380 to route traffic and perform other functions between the endpoints as described in more detail below.

Figure 4:
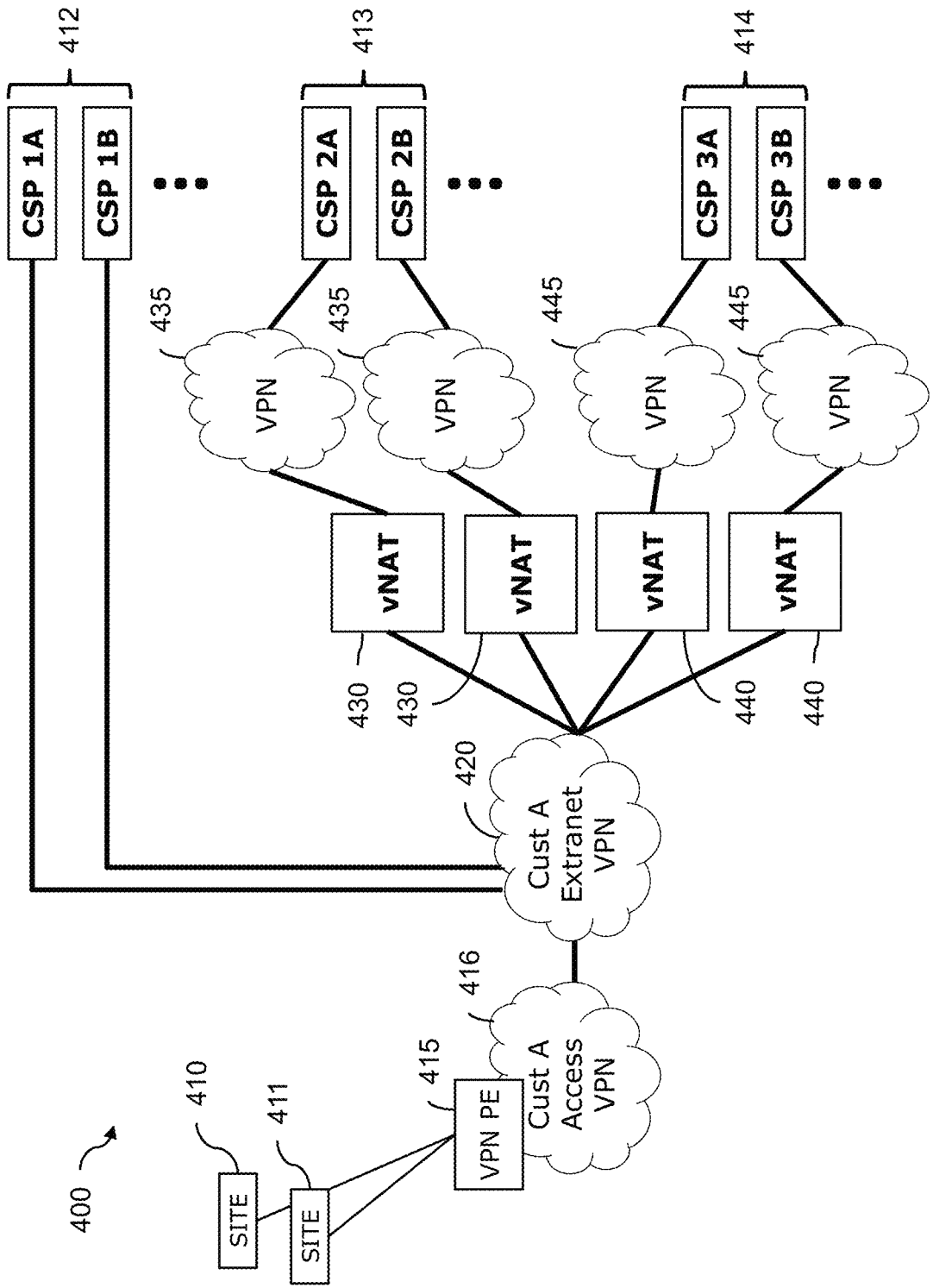
FIG. 4 is a schematic diagram showing types of cloud service providers used by network service customers.

A cloud service provider may partner with the network services provider to provide cloud services having a predetermined minimum quality of service. Cloud service providers may have particular connectivity and service chain requirements that must be configured by the network service provider. In developing the presently described systems and methods, the authors have identified three types of cloud service provider subclasses. It should be noted that other numbers of subclasses and types of subclasses may be used without departing from the spirit and scope of the present disclosure. The three cloud service provider subclass types used in the present disclosure will be described with reference to the network 400 of FIG. 4. In the network 400, customer enterprise site endpoints 410, 411 of a particular customer 'A' connect to cloud service providers through one or more service provider edges 415 of an access VPN 416, which accesses an extranet VPN 420 dedicated to the particular customer.

Type 1 cloud service providers 412 can use a direct connection with the customer site endpoints 410, 411, without any network address translation in the path. The cloud service providers use the private network addresses used by the network services customer.

Type 2 cloud service providers 413 require network address translation such as that provided by a virtual network address translator (vNAT) 430 to translate the private network addresses used by the network services customer into public Internet addresses, and vice versa. The type 2 cloud service provider also requires a segregated backhaul model in which, for each network services customer, a separate VPN 435 or other trusted domain transport faces the cloud services provider 413. The dedicated VPNs 435 carry traffic only for the single network services customer 'A'.

Type 3 cloud service providers 414, like the type 2 cloud services providers 413, require vNATs 440 to translate the private network addresses used by the network services customer into public Internet addresses, and vice versa. The type 3 cloud service provider, however, uses an aggregated backhaul model in which traffic of multiple network services customers, including customer 'A' and other network services customers, is aggregated on single VPNs 445 or other trusted domain transport facing the cloud services provider 414. The shared VPNs 445 carry the traffic of multiple customers.

In the present disclosure, interconnections between cloud service providers and network services customer sites are described with reference to "routing arrangements." Routing arrangements are groups or subsets of routers that are configured to perform particular routing functions and other functions on traffic between the cloud service providers and network services customer sites. The routing arrangements are created by a routing configuration server 310 (FIG. 3) of the network service provider using routing configuration templates.

Figure 5:
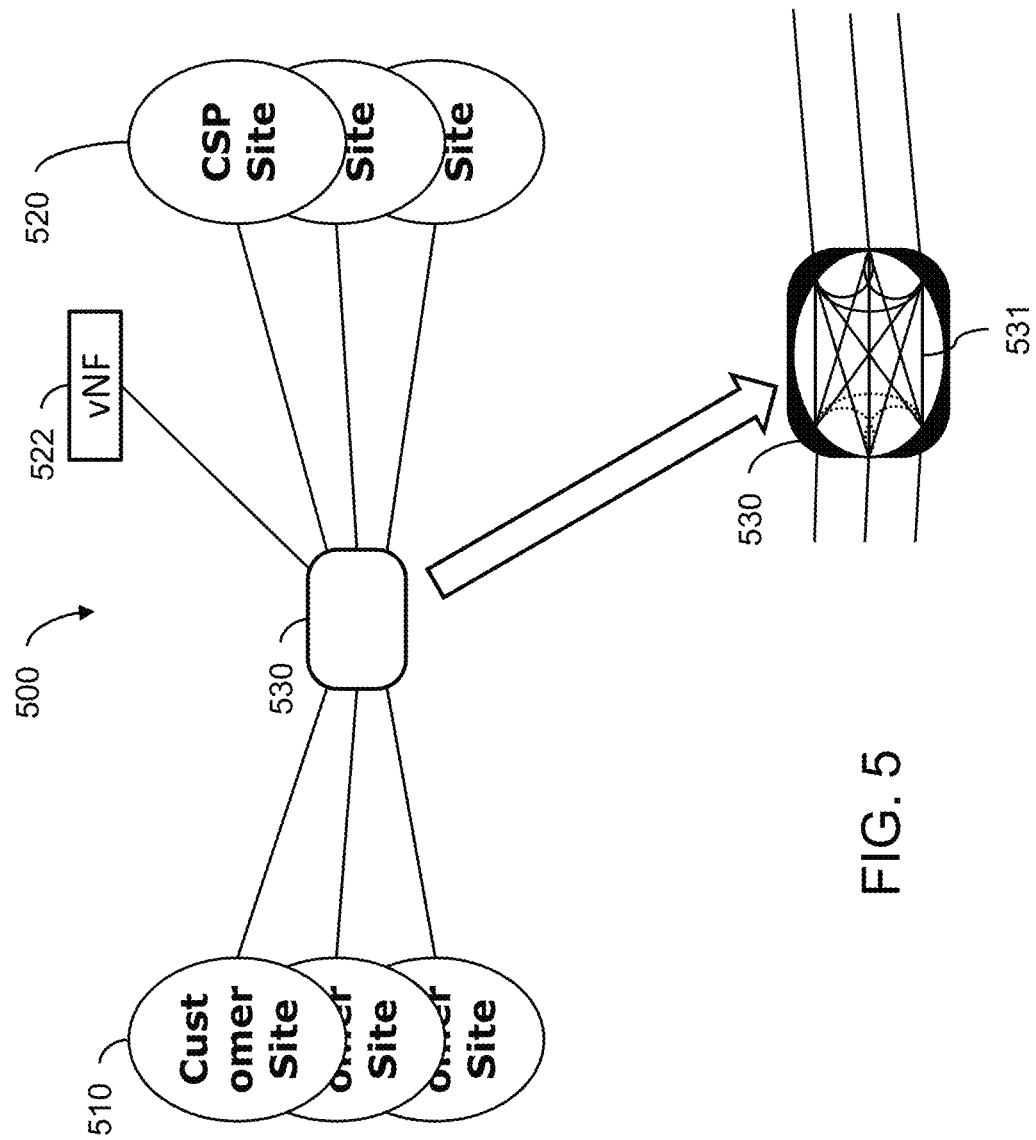
FIG. 5 is a schematic diagram illustrating a routing arrangement providing connections between network service customers and cloud service providers in accordance with aspects of the present disclosure.

One such routing arrangement 530, shown in FIG. 5, is used in a computer communications network 500 to connect network service customer sites 510 with "type 1" cloud service providers 520. The routing arrangement 530 is a simple, "unconstrained" interconnection routing arrangement having unconstrained "any-to any" connections 531 between all member pairs. All members can talk to each other in an unconstrained manner within their original secure routing domain and between the two secure routing domains connected via the "unconstrained" interconnect routing arrangement. If either the customer or the cloud service provider must add a new site, the site is simply added as a new member in their respective secure routing domains and inherits associated reachability (intra and inter-domain reachability).

The routing arrangement 530 is created by the network provider server 310 (FIG. 3) using a routing configuration template stored in the data storage system 315 for the purpose of creating such "unconstrained" routing arrangements (hereinafter a "first" routing configuration template).

Returning to FIG. 5, in addition to connecting to the cloud service provider sites 520, the unconstrained routing arrangement 530 may also be used in connecting to a class of virtual network function (VNF) endpoints 522 provided by the network service provider or by the network customer. The VNF 522 is a network endpoint within the unconstrained routing arrangement 530 created by the first routing configuration template. That is, VNF 522 is a member in the unconstrained reachability community of interest formed by the unconstrained routing arrangement 530.

Examples of the VNF 522 include sniffers, route monitoring probes, etc. In one example, the VNF 522 passively monitors the overall routing information distributed within the community of interest. In another example, the VNF 522 injects test packets into the community of interest to monitor performance. In yet another example, the VNF 522 uses border gateway protocol (BGP) to dynamically draw traffic into it on a temporary basis. In each case, the VNF 522 may be integrated within the community of interest in an unconstrained manner, without controlling traffic flow to and from the VNF.

Figure 6:
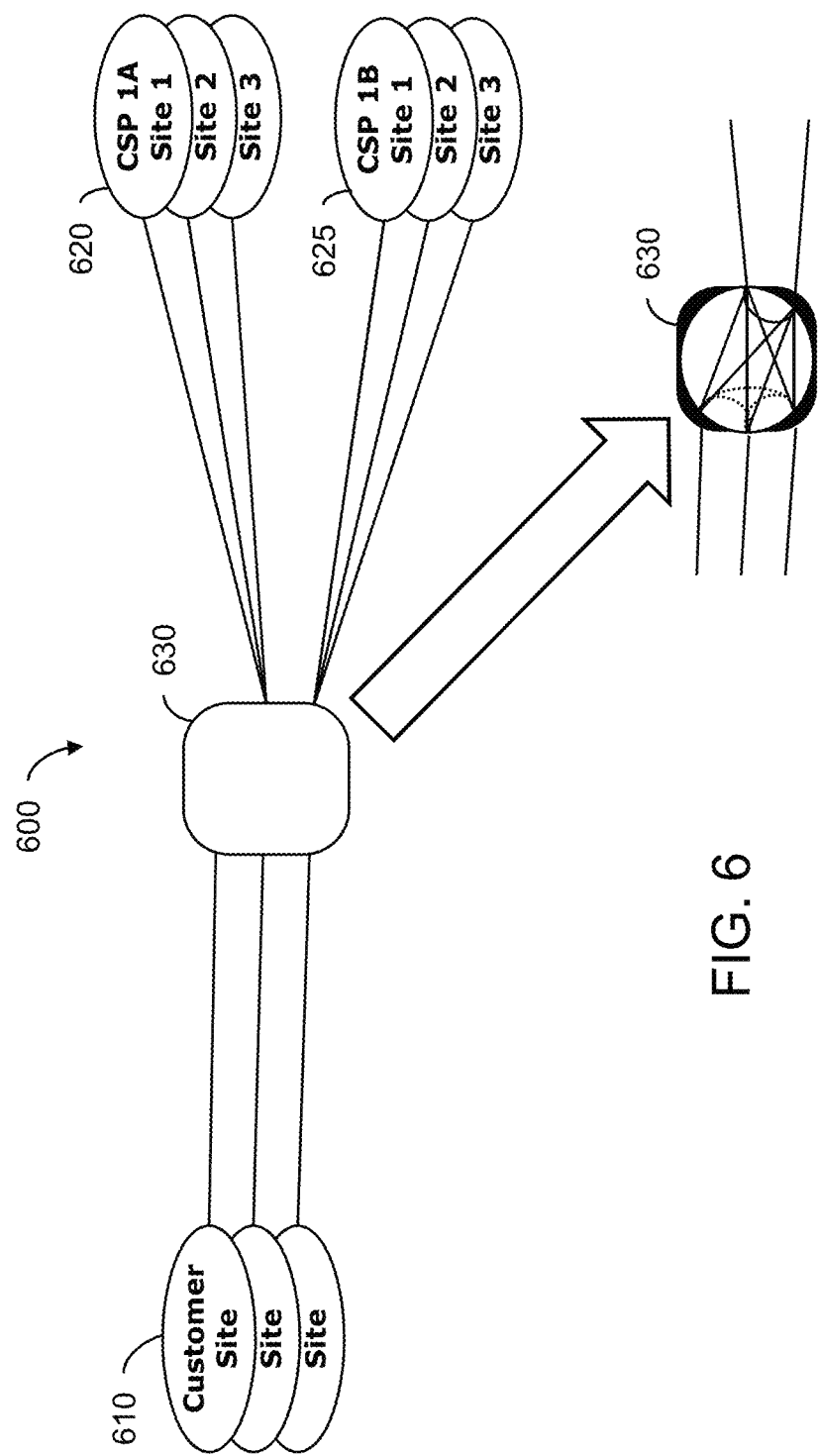
FIG. 6 is a schematic diagram illustrating another routing arrangement providing connections between network service customers and cloud service providers in accordance with aspects of the present disclosure.

The network 600, shown in FIG. 6, illustrates the use of a routing arrangement 630 that is similar in function to the arrangement 530 of FIG. 5. A first "type 1" cloud service provider 620 and a second "type 1" cloud service provider 625 are connected by the routing arrangement 630 to network service customer sites 610 of a single customer. A separate instantiation (not shown) of the routing arrangement 630, also created using the first routing arrangement template, would be used for each additional customer. The same simple "unconstrained" interconnection routing arrangement 630 is leveraged to connect the two "type 1" cloud service providers to sites of a single customer. This second cloud service provider becomes another member in the interconnected routing domain. As a member, it can talk to the interconnected network customer sites 610 and other "type 1" cloud service provider resources dedicated to that customer. The same model can be used to add additional "type 1" cloud service providers.

Figure 7:
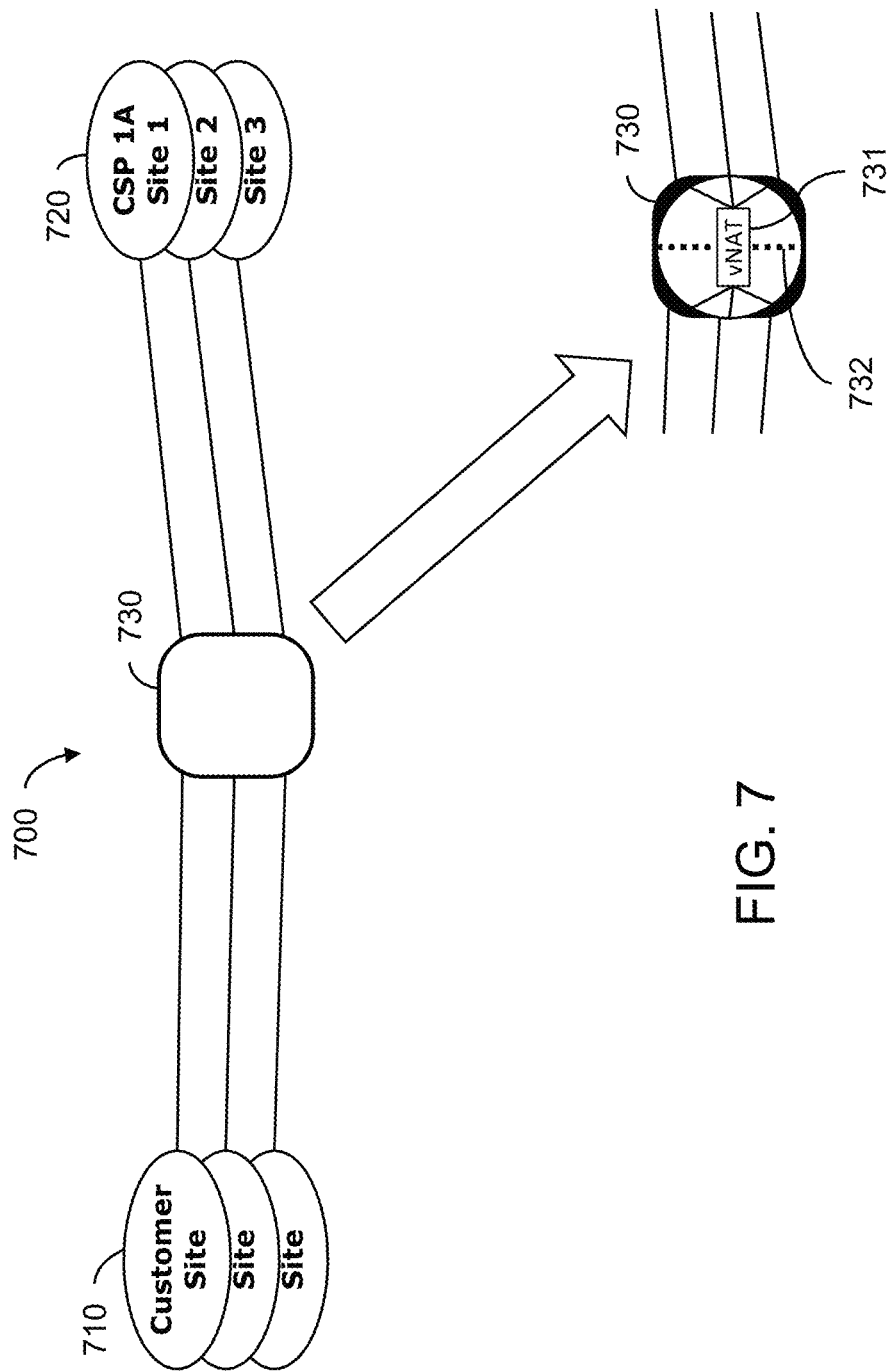
FIG. 7 is a schematic diagram illustrating another routing arrangement providing connections between network service customers and cloud service providers in accordance with aspects of the present disclosure.

Type 2 and type 3 cloud service providers require the creation of a partition between the customer sites and the individual cloud service provider site, allowing traffic across the partition only via a vNAT. To perform that function, a different template (hereinafter a "second" routing arrangement template) for creating a new type of routing arrangement 730, shown in the network 700 of FIG. 7, was developed. Type 2 and type 3 cloud service providers 720 are not able to recognize the private addresses that are commonly used in network provider VPN customer networks 710. It was therefore necessary to develop a routing arrangement 730 that creates a separation or partition 732 between customer sites and the cloud service provider site. Traffic is allowed across the partition 732 only via a vNAT function 731. The vNAT function 731 translates the VPN customer's private addresses into public addresses before they are delivered to the cloud service provider.

Figure 8:
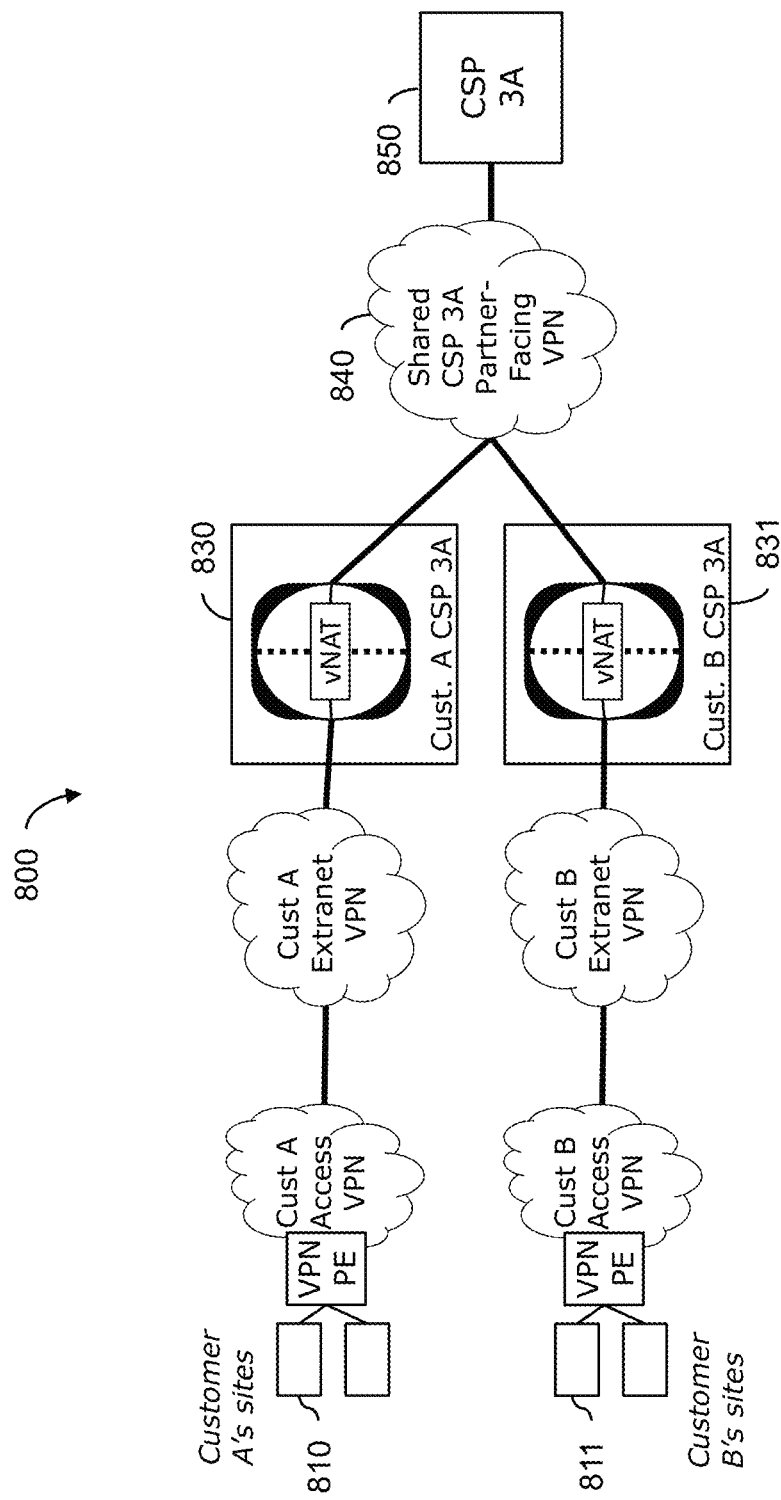
FIG. 8 is a schematic diagram illustrating a network providing connections between network service customers and cloud service providers in accordance with aspects of the present disclosure.

As illustrated by the network 800 of FIG. 8, in addition to requiring the vNAT-partitioned routing arrangements 830, 831, type 3 cloud service providers require that the traffic associated with multiple VPN customers 810, 811 be pooled into a single domain 840. That traffic is delivered to the cloud service provider 850 over a common vLAN tag on the pair of 10 GigE pipes at the data plane meet-me. In sum, the type 3 cloud service provider requires vNAT partitioning and an aggregated VPN model.

Figure 9:
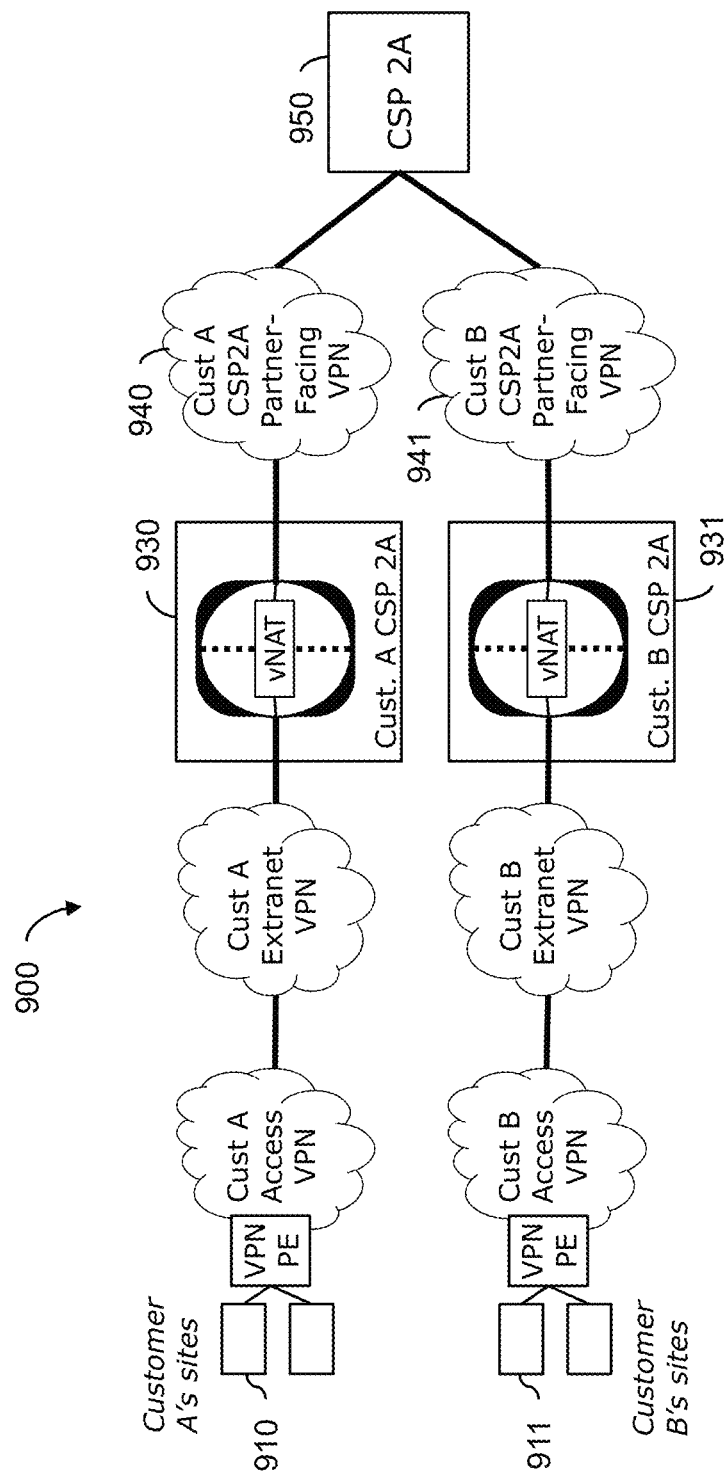
FIG. 9 is a schematic diagram illustrating another network providing connections between network service customers and cloud service providers in accordance with aspects of the present disclosure.

In contrast, as illustrated by the network 900 of FIG. 9, a type 2 cloud service provider 950 requires that the traffic associated with multiple VPN customers 910, 911 be segregated into a multiple, customer-specific domains 940, 941. While taking advantage of the "vNAT partitioned" routing arrangements 930, 931, the type 2 cloud service provider 950 requires that traffic associated with different customers be segregated and delivered to the cloud service provider on a different vLAN tag per VPN customer.

Figure 10:
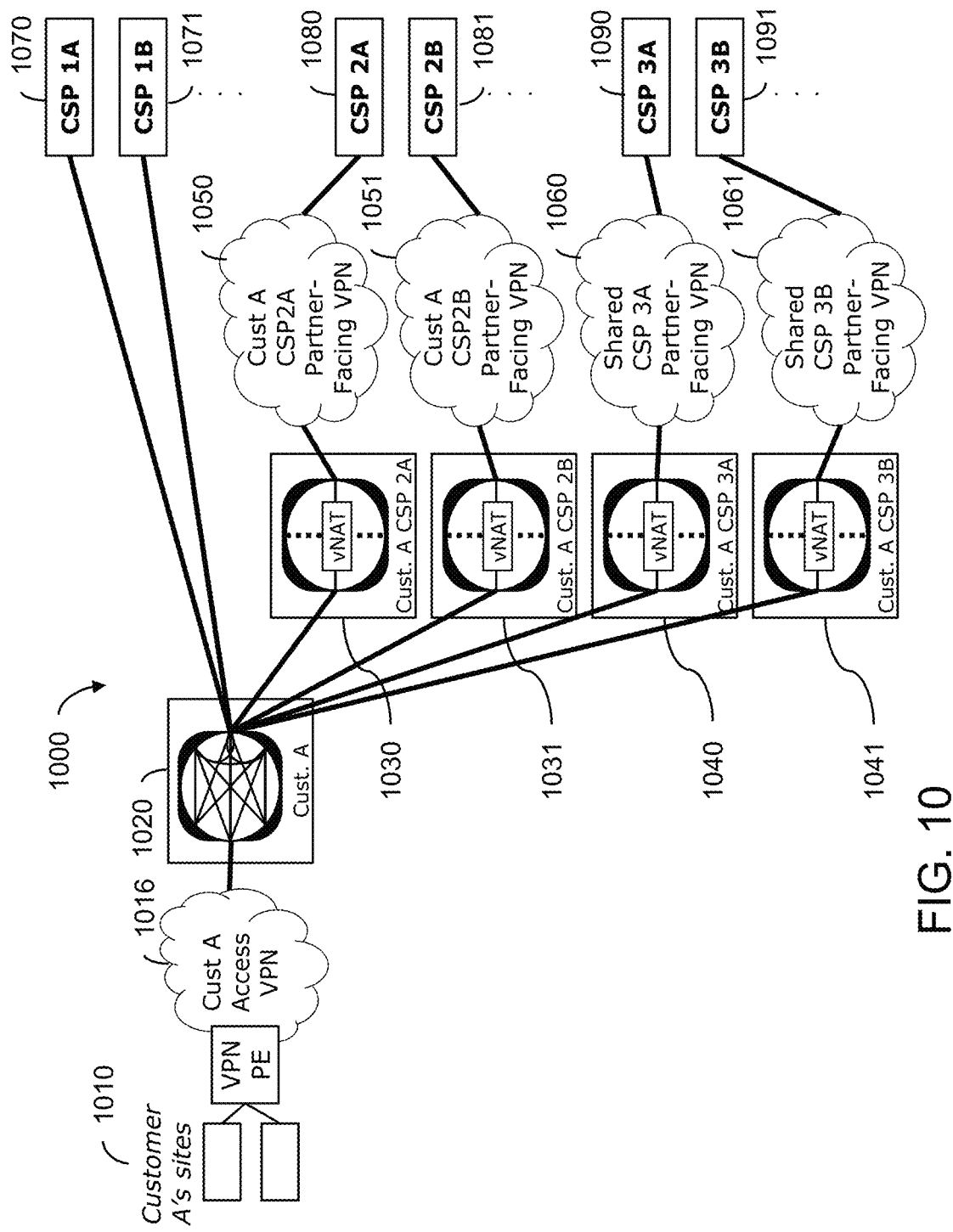
FIG. 10 is a schematic diagram illustrating another network providing connections between network service customers and cloud service providers in accordance with aspects of the present disclosure.

In an exemplary network 1000 shown in FIG. 10, a customer may buy service for its customer sites 1010 to multiple cloud service providers of different types. The network 1000 illustrates how the different routing arrangements 1020, 1030, 1031, 1040, 1041 may be sequenced to connect to the three types of cloud service providers discussed above.

The customer sites 1010 connect through a customer access VPN 1016 to an unconstrained interconnection routing arrangement 1020 having unconstrained "any-to any" connections to one or more type 1 cloud service providers 1070, 1071. The customer sites are also connected through the unconstrained routing arrangement 1020 to several other routing arrangements permitting connection to other types of cloud service providers. For example, connections are made with type 2 cloud service providers 1080, 1081 using routing arrangements 1030, 1031 including vNATs. The routing arrangements 1030, 1031 are connected through segregated VPNs 1050, 1051 to the cloud service providers 1080, 1081. The segregated VPNs 1050, 1051 are used exclusively by the customer that controls sites 1010; other customers connect to the cloud service providers 1080, 1081 using different, exclusive VPNs.

Other connections are made with type 3 cloud service providers 1090, 1091 using routing arrangements 1040, 1041 including vNATs. The routing arrangements 1040, 1041 are connected through aggregated VPNs 1060, 1061 to the cloud service providers 1090, 1091. The aggregated VPNs 1060, 1061 are shared by the customer that controls sites 1010 with other customers accessing the cloud service providers 1090, 1091.

Figure 11:
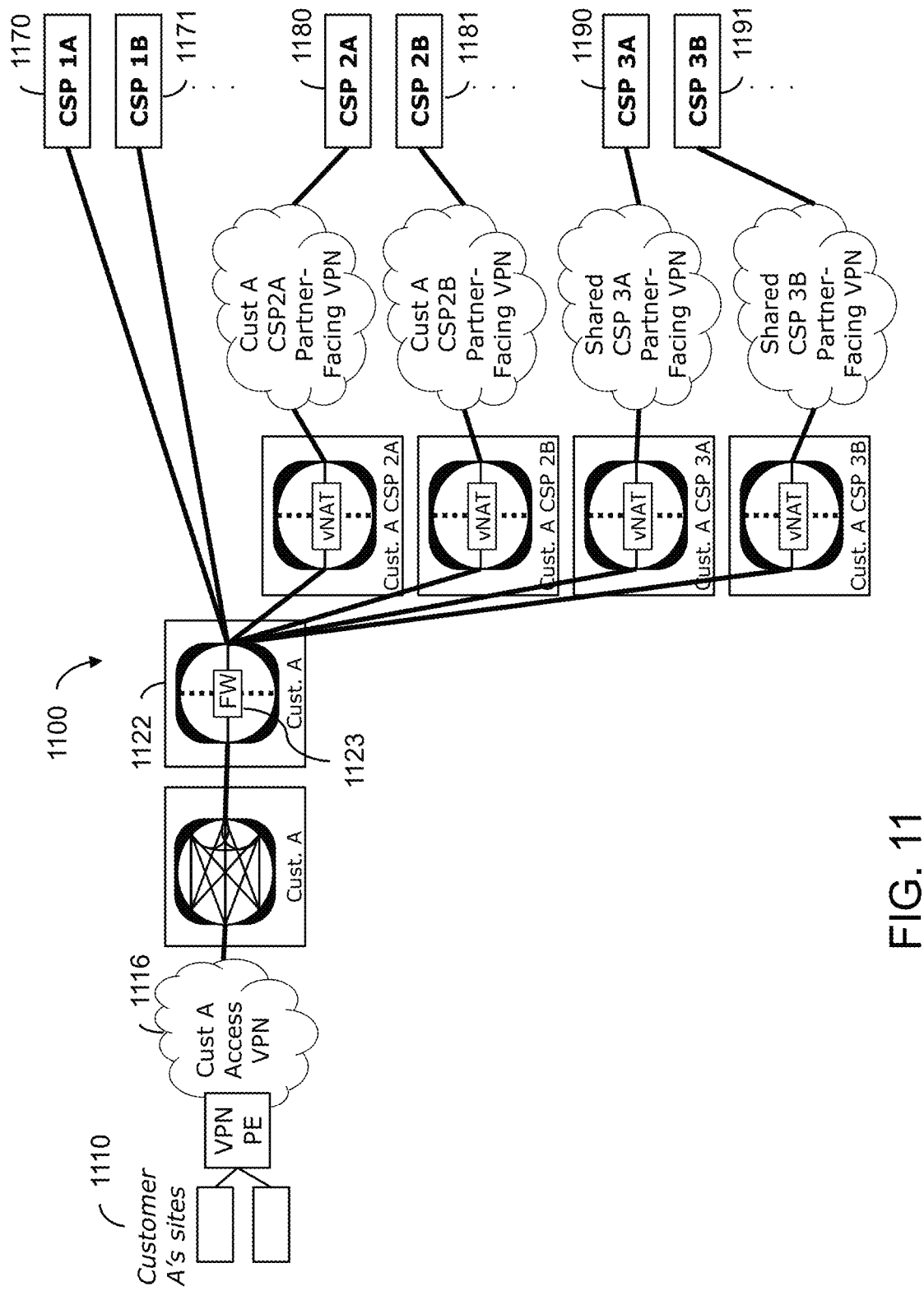
FIG. 11 is a schematic diagram illustrating another network providing connections between network service customers and cloud service providers in accordance with aspects of the present disclosure.

Customers may furthermore require the ability to force their traffic through a firewall as a way of enforcing customer-specific security policies on the subject data flows. As shown in the network 1100 of FIG. 11, a modified version 1122 of the "partitioned" interconnection routing arrangement is used. The modified version of the partitioned interconnection routing arrangement may be created using the same "second" template, but installing a different virtual network function to operate on traffic crossing the partition. In the interconnect routing arrangement 1122, instead of a vNAT acting as the intermediary between the two sides of the partition, a firewall (FW) 1123 acts as the intermediary. In the network 1100, that firewall routing arrangement is applied at a level of the customer access VPN 1116. All traffic associated with the given customer VPN 1116 between the customer sites 1110 and the associated cloud services providers 1170, 1171, 1180, 1181, 1190, 1191 is forced through the firewall 1123. Other virtual network functions or appliances may be used in place of the firewall and vNAT. For example, a routing arrangement having a WAN accelerator between partitions may be used. In other examples, functions implementing security monitoring systems or remote access servers may be used in place of the firewall 1123 in the routing arrangement 1122. One skilled in the art will recognize that other network functions may be used without departing from the scope or spirit of the disclosure. In any case, the second routing configuration template is used to create a partitioned routing arrangement in which traffic between the partitions is operated on by the network function.

Figure 12:
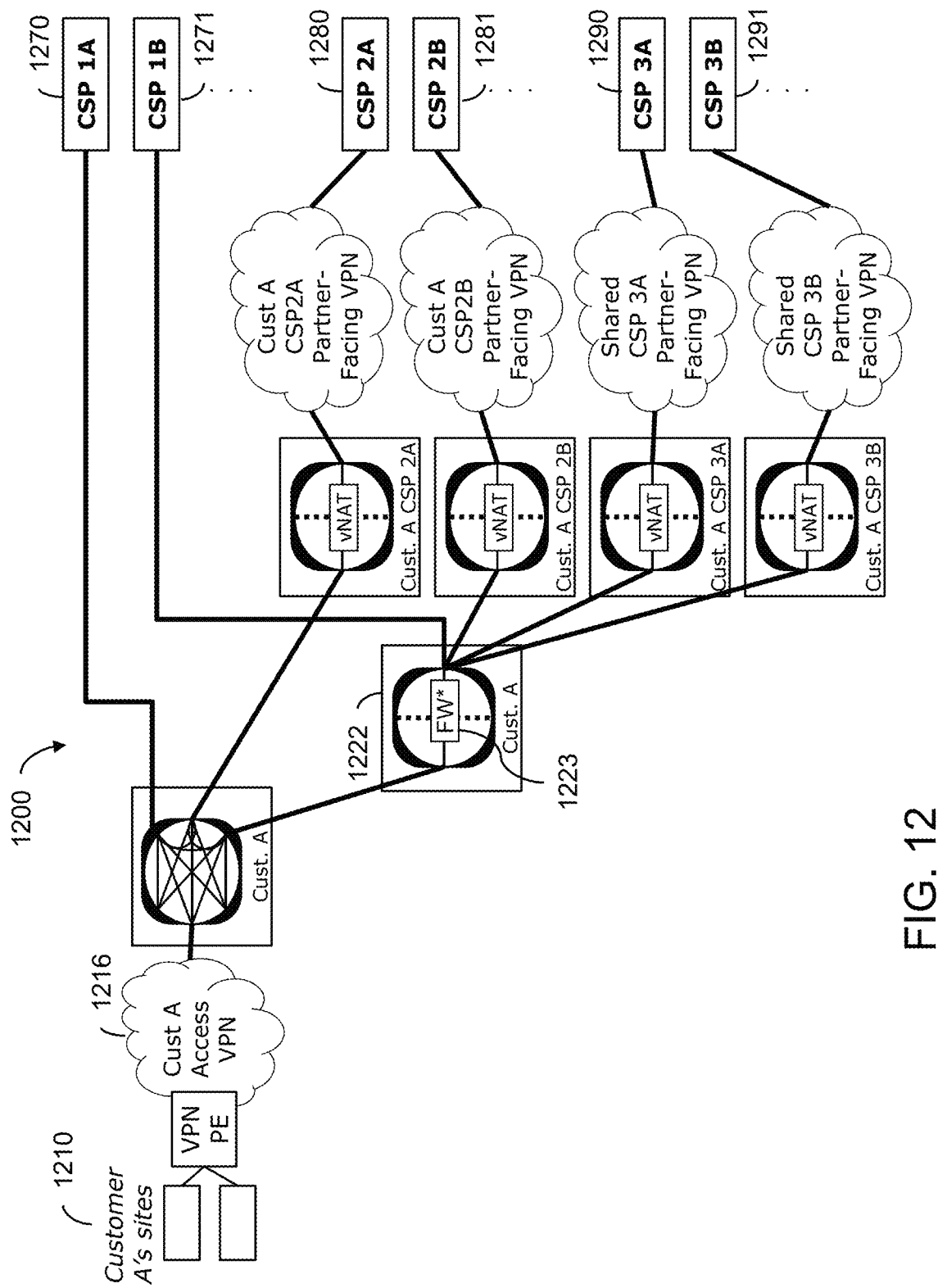
FIG. 12 is a schematic diagram illustrating another network providing connections between network service customers and cloud service providers in accordance with aspects of the present disclosure.

The network 1200, shown in FIG. 12, illustrates the use of a custom firewall appliance (FW*) 1223 in a partitioned routing arrangement 1222. In that way, a customer 1210 may be given the option of using its own firewall (BYOA—Bring Your Own Appliance) in connections with the cloud service providers 1270, 1271, 1280, 1281, 1290, 1291. In that embodiment, it may furthermore be beneficial to change the granularity of applying same FW* partitioned interconnect routing arrangement. To that end, instead of applying the firewall 1223 at the entire customer VPN 1216 level, the firewall is selectively applied at the network provider vLAN/VNC level. In the network 1200, connections with the cloud service providers 1271, 1281, 1290, 1291 are firewalled, while connections with the cloud service providers 1270, 1280 are not.

Figure 13:
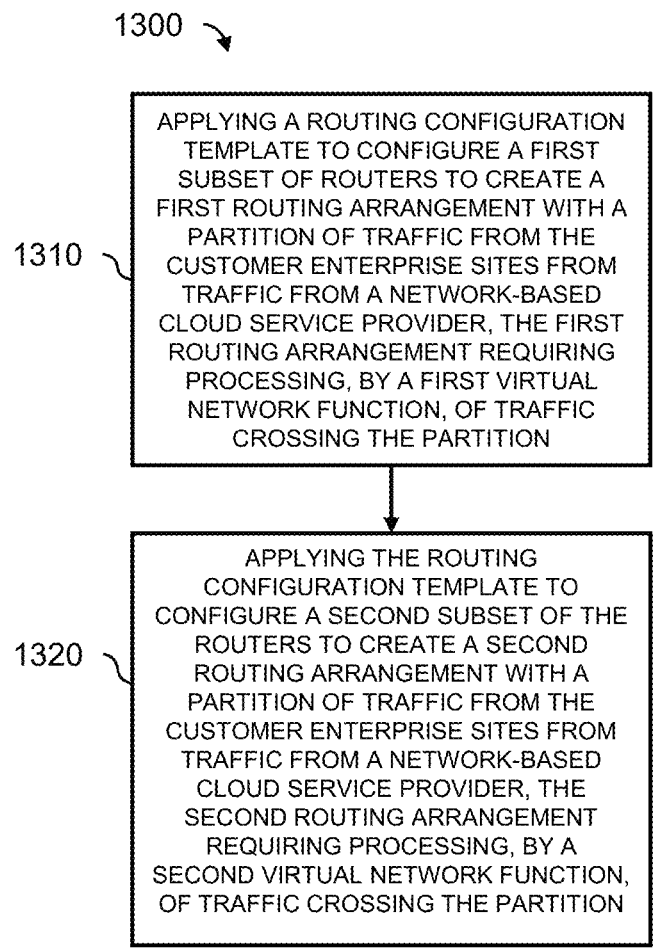
FIG. 13 is a flow diagram showing a method in accordance with aspects of the present disclosure.

A method for interconnecting customer enterprise sites of a network customer with network-based cloud service providers will now be described with reference to the block diagram 1300 of FIG. 13. A routing configuration template is applied in operation 1310 to configure a first subset of the routers to create a first routing arrangement. The first routing arrangement includes a partition of traffic from the customer enterprise sites from traffic from a network-based cloud service provider. The first routing arrangement further requires processing, by a first virtual network function, of traffic crossing the partition.

The routing configuration template is additionally applied, at operation 1320, to configure a second subset of the routers to create a second routing arrangement. The second routing arrangement includes a partition of traffic from the customer enterprise sites from traffic from a network-based cloud service provider. The second routing arrangement requires processing, by a second virtual network function, of traffic crossing the partition.

The virtual network functions may, for example, be a virtual network address translator, a firewall, a WAN accelerator, a security monitoring system of a remote access server. The second routing arrangement may route traffic from multiple customer enterprise sites through a common closed trusted domain to the second network-based cloud service provider, or, alternatively, may route traffic between the second routing arrangement and the second network-based cloud service provider through separate closed trusted domains for each customer enterprise site.

Figure 14:
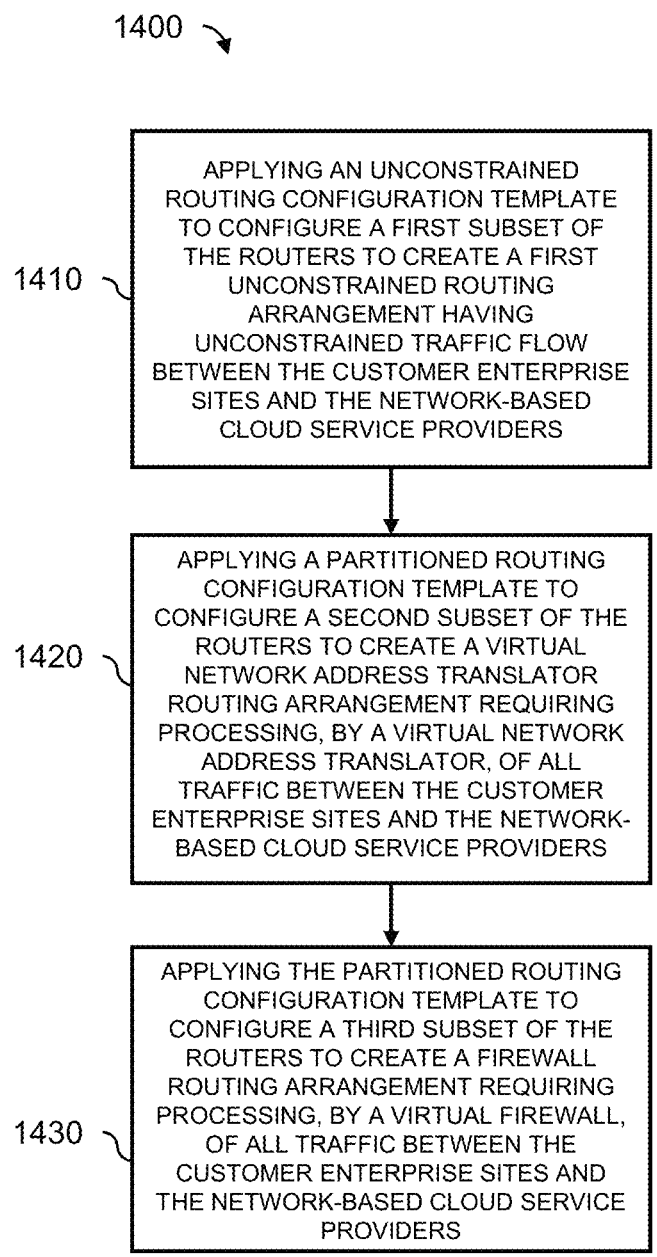
FIG. 14 is a flow diagram showing another method in accordance with aspects of the present disclosure.

A method for interconnecting customer enterprise sites of a network customer with network-based cloud service providers according to another aspect of the disclosure will now be described with reference to the block diagram 1400 of FIG. 14. An unconstrained (or first) routing configuration template is applied at block 1410 to configure a first subset of the routers to create a first unconstrained routing arrangement having unconstrained traffic flow between the customer enterprise sites and the network-based cloud service providers.

A partitioned (or second) routing configuration template is applied at block 1420 to configure a second subset of the routers to create a virtual network address translator routing arrangement requiring processing, by a virtual network address translator, of all traffic between the customer enterprise sites and the network-based cloud service providers. The partitioned routing configuration template is also applied at block 1430 to configure a third subset of the routers to create a firewall routing arrangement requiring processing, by a virtual firewall, of all traffic between the customer enterprise sites and the network-based cloud service providers.

The hardware and the various network elements used in implementing the above-described processes and systems comprise one or more processors, together with input/output capability and computer readable storage devices having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the hardware elements also includes memory that functions as a data memory that stores data used during execution of programs in the processors, and is also used as a program work area. The memory may also function as a program memory for storing a program executed in the processors. The program may reside on any tangible, non-volatile computer-readable storage device as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including routers, personal computers (PCs), hand-held devices, multi-processor systems, microprocessor-based programmable consumer electronics, network PCs, minicomputers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable storage device such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A computer communication network interconnecting customer enterprise sites of network customers with network-based cloud service providers, comprising:
   a plurality of routers interconnecting the customer enterprise sites with the network-based cloud service providers;
   a data storage system storing a first, a second and a third routing configuration template, wherein:
   the first routing configuration template includes data for configuring a subset of the routers to which the first routing configuration template is applied to create a first type of routing arrangement, the first type of routing arrangement establishing unconstrained reachability between customer enterprise sites connected by the first type of routing arrangement and network-based cloud service providers connected by the first type of routing arrangement;
   the second routing configuration template includes data for configuring a subset of the routers to which the second routing configuration template is applied to create a second type of routing arrangement, the second type of routing arrangement requiring processing, by an installed virtual network function, of traffic between customer enterprise sites connected by the second type of routing arrangement and network-based cloud service providers connected by the second type of routing arrangement, the second type of routing arrangement transmitting traffic from customer enterprise sites of only a single network customer via a separate closed trusted domain; and
   the third routing configuration template includes data for configuring a subset of the routers to which the third routing configuration template is applied to create a third type of routing arrangement, the third type of routing arrangement requiring processing, by an installed virtual network function, of traffic between customer enterprise sites connected by the third type of routing arrangement and network-based cloud service providers connected by the third type of routing arrangement, the third type of routing arrangement transmitting traffic from customer enterprise sites of a plurality of network services customers via a common closed trusted domain; and
   a network configuration server connected for accessing the routing configuration templates stored in the data storage system and connected for configuring the routers, the network configuration server comprising a processor and memory containing computer readable instructions that, when executed by the processor, cause the processor to apply the first, second and third routing configuration templates stored in the data storage system to configure a first, a second, a third and a fourth subset of the routers, by:
      applying the first routing configuration template to the first subset of the routers, whereby traffic from customer enterprise sites of a first network customer is transmitted by the first subset of the routers with unconstrained reachability to a first network-based cloud service provider and to the second and third subsets of the routers,
      applying the second routing configuration template to the second subset of the routers, wherein the installed virtual network function is a firewall, and whereby the traffic transmitted from the first subset of routers to the second subset of routers is processed by the firewall and transmitted to the fourth subset of the routers and to a second network-based cloud service provider;

applying the second routing configuration template to the third subset of the routers, wherein the installed virtual network function is a network address translator function, and whereby the traffic transmitted from the first subset of the routers to the third subset of the routers is processed by the network address translator function and is transmitted to a third network-based cloud service provider via a separate closed trusted domain containing only traffic to and from customer enterprise sites of the first network customer; and applying the third routing configuration template to the fourth subset of the routers, wherein the installed virtual network function is a network address translator function, and whereby, traffic transmitted from the second subset of the routers to the fourth subset of the routers is processed by the network address translator function and is transmitted to a fourth network-based cloud service provider via a common closed trusted domain containing traffic to and from customer enterprise sites of multiple network customers;

whereby traffic to and from the first and third network-based cloud service providers is not firewalled and traffic to and from the second and fourth network-based cloud service providers is firewalled; and whereby traffic to and from the first network-based cloud service providers is not processed by a network address translation function and traffic to and from the second, third and fourth network-based cloud service providers is processed by a network address translation function.

2. The computer communication network of claim 1, wherein applying the first routing configuration template to the first subset of the routers furthermore connects the customer enterprise sites of the first network customer and the first network-based cloud service provider to a monitoring virtual network function.

* * * * *